Figure 1:
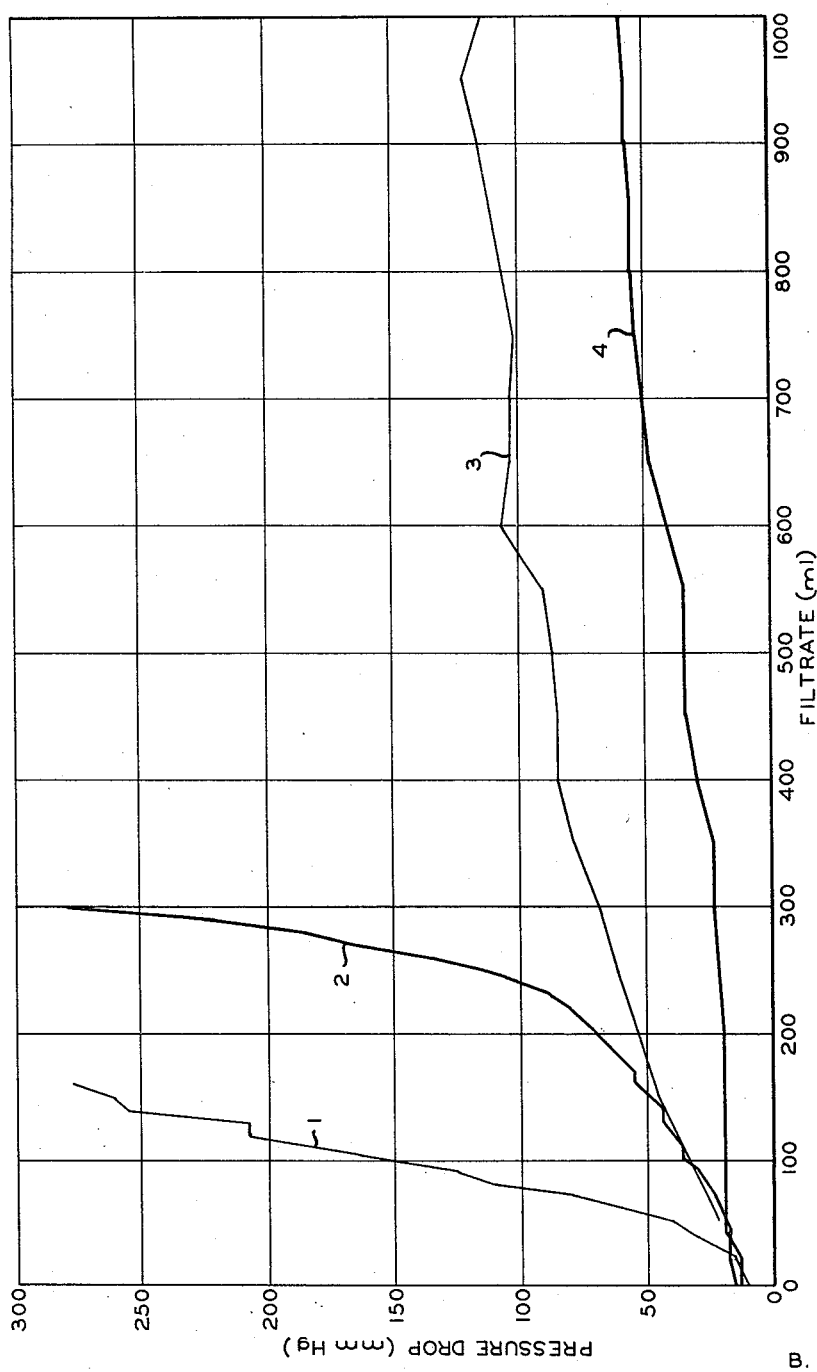

INVENTOR.
B. MITACEK
BY Hudson and Young
ATTORNEYS

# United States Patent Office 2,952,121
Patented Sept. 13, 1960

---

2,952,121

PREVENTION OF FILTER PLUGGING UTILIZING AN IMPROVED JET ENGINE FUEL

Bill Mitacek, Bartlesville, Okla., assignor to Phillips Petroleum Company, a corporation of Delaware Filed Sept. 26, 1955, Ser. No. 536,663

9 Claims. (Cl. 60—35.4)

This invention relates to a novel fuel composition. In one aspect, this invention relates to the operation of continuous combustion power plants utilizing a conventional jet fuel without the formation of ice crystals in the fuel.

The term continuous combustion power plant as hereinafter used, includes turbo-prop, turbo-jet, and ram-jet engines. It is to be understood, however, that in the practice of this invention pulse-jet engines are to be included because a pulse-jet engine will also operate with a fuel designed to be used in the continuous combustion type of power plant.

In the operation of aircraft powered by a jet propulsion engine, fuels must be capable of being delivered to the combustion chamber under all conditions of operations, and serious operational difficulties have been encountered in pumping the fuel containing dissolved water through fine filters at low temperatures which are present during flights at high altitudes. With such conditions of operation, plugging of the passages of the filters occurs and appears to be due to ice crystals within the passages under some conditions of operation, and the formation of a layer of ice in the form of sludge on the surface of the filter under other conditions of operations.

The fuel atomizer and other component parts of the fuel system of continuous combustion power plants, for example, in jet propulsion power plants require that the fuel be substantially free of suspended matter. Accordingly, filters of some materials such as felt or paper are used in the fuel system to remove substantially all suspended matter. Since the clearances in conventional jet engine fuel atomizers and other parts of the fuel system are very small, the passages of these filters are usually micronic in dimensions. Obviously, passages of these small dimensions are readily plugged which results in the development of a considerable pressure drop across the filter or complete stoppage of the flow of fuel. The increase in pressure drop across a filter placed on the discharge side of the fuel pump reduces the pressure available for atomization of the fuel. The increase in pressure drop across a filter placed on the inlet side of the fuel pump results in a diminution or complete cessation of the fuel supplied to the combustion chamber. Hydrocarbons intended for use as jet engine fuels are substantially free of solid matter; however, these hydrocarbons are capable of dissolving small quantities of water, and it is this small quantity of dissolved water which freezes out resulting in ice crystals which plug the passages of the filters. The severity of filter plugging seems to depend on the temperature of the fuel and the filter, the flow rate through it, the rate of resolution of the solid material, the water content, and other factors. The filter plugging problem appears to be more severe in aircraft jet engines where operation at various temperatures, instead of constant low temperature, is encountered. Thus, when the ground temperature is high and conditions of high humidity prevail, the plugging characteristics of a jet engine fuel in high altitude operations is increased because of the increased solubility of water in the hydrocarbon at high temperature storage and the availability of moisture under humid conditions. Under conditions of operation where the fuel has been exposed to low temperature for a prolonged period of time, such as in storage, the suspended water tends to coalesce and settle to the bottom of the fuel tank in the form of ice crystals and the tendency for the filter in the engine to become plugged with such fuel is reduced.

In the specification and in the claims the term "jet engine fuel" refers to a fuel designed to be used in turbo-prop, turbo-jet, ram-jet and pulse-jet engines.

Thus, it is an object of this invention to provide an improved method for operating a continuous combustion power plant at low temperatures.

Another object is to provide a method for the prevention of the formation of ice crystals in a continuous combustion power plant fuel which is being operated at low temperatures.

It is another object to provide a continuous combustion power plant fuel containing an additive for reducing the formation of ice crystals in the fuel at low temperatures.

Another object is to provide a method for preventing the plugging of the filters in a continuous combustion power plant fuel system when operated at low temperatures.

Other objects will be apparent to one skilled in the art in the light of the instant specification.

I have discovered that improved operation of a continuous combustion power plant, for example, a jet engine, can be obtained by incorporating in the fuel a small amount of a compound represented by the general formula;

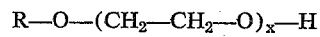

$$R\text{—}O\text{—}(CH_2\text{—}CH_2\text{—}O)_x\text{—}H$$

in which "R" is a methyl or ethyl group and "x" is an integer less than 5, so as to reduce the formation of crystals resulting from the dissolved water. Conventional hydrocarbon jet engine fuels are rendered free from filter plugging when from about 0.001 to about 3.0 volume percent and preferably from about 0.01 to about 1.5 volume percent of a compound represented by the general formula above is incorporated to the jet fuel. Among the class of compounds encompassed by the general formula are the methyl and ethyl ethers of ethylene glycol, and the methyl and ethyl ethers of diethylene glycol. Methyl ether of diethylene glycol, known also as methyl carbitol, is preferred.

The continuous combustion power plant fuels applicable in this invention are those fuels comprising essentially a hydrocarbon stock containing at least 10 volume percent of normal paraffins boiling in the range of between about 90° to about 550° F., preferably from about 150° to about 500° F., and having a 90 percent ASTM point above 470° F. Such fuels are commonly referred to as jet-engine fuels. The fuel may also contain commonly used additives, such as anti-corrosives, oxidation inhibitors, and the like. The fuel should be substantially free of elemental sulfur.

Filter clogging characteristics of the typical jet fuel at low temperatures were determined according to a method devised for this particular purpose. The specifications of this jet fuel are tabulated in the following Table I.

TABLE I

*Laboratory inspection data on jet fuel tested*

Reid Vapor Pressure _____ 6.50
Gravity, API _____ 58.6

Distillation (D86), Percent Evap. (29.92 in. Mercury)

| IBP | 5 | 10 | 20 | 30 | 40 | 50 | 60 | 70 | 80 | 90 | 95 | EP | Rec. Percent | Res. Percent | Loss Percent |
|---|---|---|---|---|---|---|---|---|---|---|---|---|---|---|---|
| 199 | 118 | 128 | 152 | 183 | 247 | 297 | 323 | 344 | 382 | 507 | 547 | 562 | 97.8 | 1.6 | 0.6 |

Freezing point, °F. _____ −49
Cloud point, °F. _____ −48
Pour point, °F. _____ −85
Viscosity, cs. at 100° F. _____ 0.70
Viscosity, cs. at −40° F. _____ 2.20
Aromatics, vol. percent _____ 1.3
Bromine No. _____ 27.6
Aniline point, °F. _____ 129.6
Air jet gum, mg./100. ml. _____ 1.7
Acceleration gum, 16 hour mg./100 ml. _____ 4.5
Flash point, °F. _____ −24.0
Water content, 60° F. _____ Saturated The filter plugging characteristics of jet-engine fuels were tested by a procedure and employing apparatus designed particularly for these tests. The apparatus consists of an enclosed cell element containing a filter having an effective area of 1.0 square centimeter. The filter used is a 10 micron paper, made by the Skinner Division, Bendix Aviation Corporation. The fuel is admitted to the element through a copper coil so constructed that the coil and filtration unit can be completely immersed in a cooling bath which is maintained at a predetermined temperature. The fuel is supplied from a reservoir system designed to insure a constant head. Once the fuel in the filter bath has reached the desired predetermined temperature, the flow of the fuel to be tested commences. The filtrate is received in a graduate and readings are taken for each 10 milliliters filtered so that a curve relating pressure drop across the filter and volume may be plotted.

EXAMPLE I

Filtration tests were conducted employing the jet fuel described above, water saturated at 60° F., at subfreezing temperature (−20° F.). Methyl carbitol was added in various percentages to the jet fuel and filter tests were then conducted on such material at −20° F. A test is completed by filtering 1000 ml. of sample or reaching a pressure drop across the filter of 260 mm. of mercury whichever occurs first. In these tests, a filter is considered to be "plugged" when a pressure drop of 260 mm. of Hg is reached.

A summary of the results obtained are shown in the following tabulation:

TABLE II

| Run | Fuel | Methyl Carbitol (Vol. percent) | Test Temp., °F. | Volume Filtered (ml.) | Pressure Drop (mm. Hg) |
|---|---|---|---|---|---|
| 1 | 100 | | −20 | 150 | 260 |
| 2 | 100 | | −20 | 295 | 260 |
| 3 | 99.94 | 0.06 | −20 | 1,000 | 112 |
| 4 | 99.5 | 0.5 | −20 | 1,000 | 58 |

It may be noted from the above tabulation that the fuel containing no methyl carbitol in runs 1 and 2 at −20° F. plugged the filter after 150 and 295 ml. had been filtered, and that after adding 0.06 and 0.5 volume percent of methyl carbitol no plugging occurred at −20° F.

The data obtained from Example I is shown in Fig. 1 by plotting the pressure drop across the filter versus the milliliters of filtrate obtained. For each 10 ml. of filtrate received in the graduate, the pressure drop at that moment was observed and is recorded in Fig. 1. It is readily apparent that runs 3 and 4 containing 0.06 and 0.5 volume percent of methyl carbitol in the fuel disclose a relatively low uniform pressure drop across the filter well within the rigid requirements imposed.

EXAMPLE II

Filtration tests were also conducted employing the jet fuel described above, water saturated at 60° F., at subfreezing temperature (−20° F.). Three runs were conducted employing the fuel alone, with 0.06 isopropyl alcohol, and with 0.06 methyl carbitol. The procedure utilized in Example I was followed.

A summary of the results obtained are shown in the following tabulation:

TABLE III

| Run | Fuel | Additive (Vol. percent) | Test Temp., °F. | Volume Filtered (ml.) | Pressure Drop, mm. Hg |
|---|---|---|---|---|---|
| 1 | 100 | | −20 | 192 | 260 |
| 2 | 99.94 | 0.06 isopropyl alc. | −20 | 507 | 260 |
| 3 | 99.94 | 0.06 methyl carbitol. | −20 | 1,000 | 112 |

It is apparent from the above data that the fuel containing no additive plugged the filter after 192 ml. had been filtered; the fuel containing 0.06 volume percent of isopropyl alcohol plugged the filter after 507 ml. had been filtered. However, no plugging occurred when 0.06 volume percent of methyl carbitol is added to the fuel, the pressure drop being only 112 mm. Hg.

Figure 2:
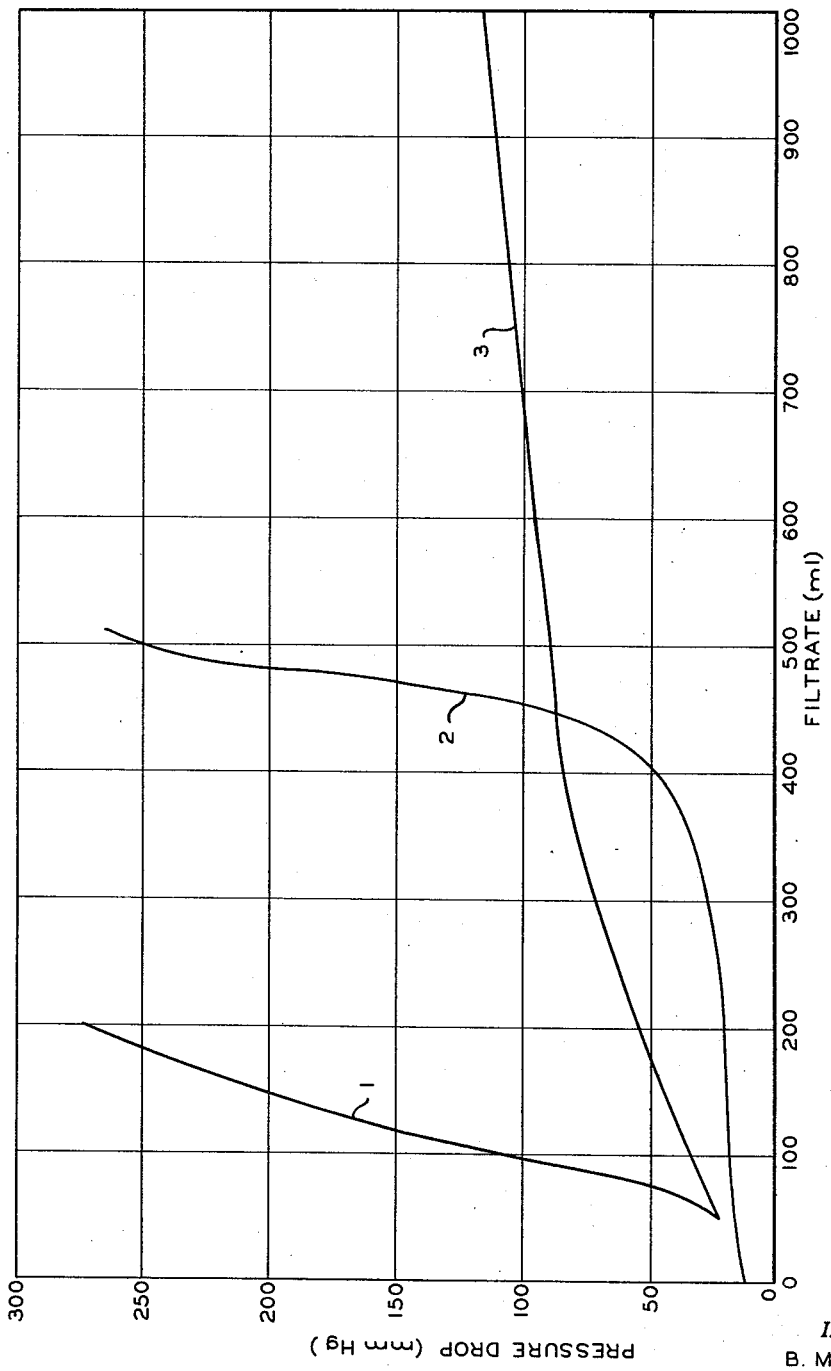

The data from Example II is disclosed in Fig. 2 in the manner described in Example I. The improved results when using a small quantity of methyl carbitol in the fuel is again manifest.

It is to be understood that the invention is not limited to the specific examples which have been offered merely as illustrations, since reasonable modifications and variations may be made without departing from the spirit and scope of the invention.

What is claimed is:

1. In a method of operating a jet engine which encounters subfreezing temperatures, said engine being equipped with a fuel filter which is subject to becoming plugged at said subfreezing temperatures by reason of the presence of water in the fuel, the improvement which comprises passing through said filter to the combustion zone of said engine a hydrocarbon jet fuel containing from 0.001 to 3 volume percent of a compound having the formula R—O—(CH$_2$—CH$_2$—O)$_x$—H wherein R is selected from the group consisting of methyl and ethyl and $x$ is an integer of 1 to 4, and burning said fuel in said combustion zone.

2. The method of claim 1 wherein said jet fuel contains between about 0.01 to 1.5 volume percent of said compound.

3. The method of claim 1 wherein said compound is the monomethyl ether of ethylene glycol.

4. The method of claim 1 wherein said compound is the monoethyl ether of ethylene glycol.

5. The method of claim 1 wherein said compound is the monomethyl ether of diethylene glycol.

6. The method of claim 1 wherein said compound is the monoethyl ether of diethylene glycol.

7. A method of preventing the plugging of fuel filters in a jet engine which is operated at subfreezing temperatures on a hydrocarbon jet fuel containing dissolved water which comprises adding to said fuel prior to passage thereof through said filters from 0.001 to 3 volume percent of a compound having the formula $$R-O-(CH_2-CH_2-O)_x-H$$

wherein R is selected from the group consisting of methyl and ethyl and $x$ is an integer of 1 to 4.

8. The method of claim 7 wherein said fuel is saturated with water.

9. The method of claim 8 wherein said compound is the monomethyl ether of diethylene glycol.

References Cited in the file of this patent

UNITED STATES PATENTS

| | | |
|---|---|---|
| 2,527,987 | Caron et al. | Oct. 31, 1950 |
| 2,563,101 | Colwell et al. | Aug. 7, 1951 |
| 2,722,099 | Wasserbach | Nov. 1, 1955 |
| 2,807,525 | Foreman | Sept. 24, 1957 |

OTHER REFERENCES

Krause: "The Oil and Gas Journal," pages 93–4 (Oct. 6, 1952).